US011757607B2

(12) United States Patent
Tzannes

(10) Patent No.: US 11,757,607 B2
(45) Date of Patent: Sep. 12, 2023

(54) LOW POWER MODE WITH LEGACY COMPATIBILITY

(71) Applicant: TQ DELTA, LLC, Austin, TX (US)

(72) Inventor: Marcos C. Tzannes, Alamo, CA (US)

(73) Assignee: TQ DELTA, LLC, Austin, TX (US)

( * ) Notice: Subject to any disclaimer, the term of this patent is extended or adjusted under 35 U.S.C. 154(b) by 1530 days.

(21) Appl. No.: 15/304,920

(22) PCT Filed: Apr. 28, 2015

(86) PCT No.: PCT/US2015/027983
§ 371 (c)(1),
(2) Date: Oct. 18, 2016

(87) PCT Pub. No.: WO2015/168117
PCT Pub. Date: Nov. 5, 2015

(65) Prior Publication Data
US 2017/0187512 A1    Jun. 29, 2017

Related U.S. Application Data

(60) Provisional application No. 61/985,168, filed on Apr. 28, 2014.

(51) Int. Cl.
*H04L 5/14* (2006.01)
*H04B 3/32* (2006.01)

(52) U.S. Cl.
CPC ............ *H04L 5/1446* (2013.01); *H04B 3/32* (2013.01); *H04L 5/1438* (2013.01); *Y02D 30/50* (2020.08)

(58) Field of Classification Search
CPC ....... H04L 5/1446; H04L 5/1438; H04B 3/32; Y02D 50/10
See application file for complete search history.

(56) References Cited

U.S. PATENT DOCUMENTS

RE39,427 E * 12/2006 O'Sullivan ........... H04L 1/1816
455/557
2005/0044505 A1* 2/2005 Laney ...................... G09G 5/14
715/781
(Continued)

FOREIGN PATENT DOCUMENTS

| EP | 2369781 A1 | 9/2011 |
| EP | 2391031 | 11/2011 |
| JP | 2005-323301 A | 11/2005 |

OTHER PUBLICATIONS

Frank Van Der Putten Alcatel-Lucent France: "G.inp: Draft Amendment 4 to Recommendation ITU-T G.998.4 (2010).; TD2014-05-05-R08",ITU-T Draft ; Study Period 2013-2016, International Telecommunication Union, Geneva ; CH, vol. 4/15, Apr. 22, 2014 (Year: 2014).*

(Continued)

*Primary Examiner* — Henry Tsai
*Assistant Examiner* — John B Roche
(74) *Attorney, Agent, or Firm* — Jason H. Vick; Sheridan Ross, PC

(57) ABSTRACT

During the development of Low Power Mode (LPM) (also known as L2 Mode) for DSL (Digital Subscriber Line) systems, it has become apparent that one of the most important issues is the impact on deployed legacy DSL systems. Legacy DSL systems are not capable of operating in the presence of large changes in crosstalk noise from neighbouring lines entering and exiting LPMs. For example, prior LPM methods at least do not assure that legacy lines will be protected to guarantee that no retrains will occur. These and other issues are addressed herein.

6 Claims, 3 Drawing Sheets

(56) References Cited

U.S. PATENT DOCUMENTS

| | | | |
|---|---|---|---|
| 2005/0254515 | A1 | 11/2005 | Suzuki et al. |
| 2005/0271129 | A1* | 12/2005 | Reina .................. H04L 1/0025 375/222 |
| 2006/0087503 | A1* | 4/2006 | Sasaki ................... G09G 5/00 345/211 |
| 2011/0276826 | A1* | 11/2011 | Schoppmeier ........ H04L 1/1896 714/16 |
| 2012/0026926 | A1 | 2/2012 | Frenzel et al. |
| 2013/0201836 | A1* | 8/2013 | Cook ................. H04L 12/2869 370/241 |
| 2014/0032951 | A1* | 1/2014 | Garg ................ H04W 52/0216 713/323 |
| 2017/0026257 | A1* | 1/2017 | Horsley .................. H04Q 9/00 |

OTHER PUBLICATIONS

Communication Pursuant to Rules 161(1) and 162 EPC for European Application No. 15721495.8, dated Dec. 6, 2016.
ITU Standard G.998.4 G.inp: Draft Amendment 4 to Recommendation ITU-T G. 998.4 (2010); May 5, 2014; 21 pages.
Office Action for European Application No. 15721495.8, dated Aug. 29, 2017.
ITU Standard G.992.3 "Asymmetric Digital Subscriber Line Transceivers 2 (ADSL2)" 404 pages, Apr. 2009.
ITU Standard G.997.1 "Physical Layer Management for Digital Subscriber Line (DSL) Transceivers" Jun. 2012 (150 pages).
Invitation to Pay Additional Fees and, Where Applicable Protest Fee for International Application No. PCT/US2015/027983, dated Jul. 10, 2015.
International Search Report for International Application No. PCT/US2015/027983, dated Sep. 15, 2015.
Written Opinion for International Application No. PCT/US2015/027983, dated Sep. 15, 2015.
International Preliminary Report on Patentability for International Application No. PCT/US2015/027983, dated Nov. 10, 2016.
Office Action for European Application No. 15721495.8, dated Jan. 15, 2018.
Office Action for European Application No. 15721495.8, dated Dec. 7, 2018.
Office Action (Including Translation) for Japanese Patent Application No. 2016-563176, dated Mar. 4, 2019.
Intent to Grant for European Application No. 15721495.8, dated Oct. 9, 2019.
Notice of Allowance (Including Translation) for Japanese Patent Application No. 2016-563176, dated Sep. 9, 2019.
Intent to Grant for European Application No. 15721495.8, dated Jan. 15, 2020.
Examination Report for Canadian Application No. 2,944,006, dated Jun. 23, 2021.
First Office Action (Including Translation) for Korean Application No. 10-2016-7029583, dated Jun. 11, 2021.
Examination Report for Canadian Application No. 2,944,006, dated May 2, 2022.
Notice of Allowance (Including Translation) for Korean Application No. 10-2016-7029583, dated Apr. 11, 2022.
Notice of Allowance for Canadian Application No. 2,944,006, dated Mar. 16, 2023.

* cited by examiner

LOW POWER MODE WITH LEGACY COMPATIBILITY

RELATED APPLICATION DATA

This application is a national stage application under 35 U.S.C. 371 of PCT Application No. PCT/US2015/027983, having international filing date of Apr. 28, 2015 which designated the United States, which PCT application claims the benefit of and priority under 35 U.S.C. § 119(e) to U.S. Patent Application No. 61/985,168, filed Apr. 28, 2014, entitled "Low Power Mode with Legacy Compatibility," each of which are incorporated herein by reference in their entirety.

FIELD

An exemplary aspect relates to communications systems. More specifically, exemplary methods, systems, means, protocols and computer-readable storage media, are directed toward a low power mode in communications systems.

BACKGROUND

During the development of Low Power Mode (LPM) (also known as L2 Mode) for DSL (Digital Subscriber Line) systems, it has become apparent that one of the most important issues is the impact on deployed legacy DSL systems. Legacy DSL systems are not capable of operating in the presence of large changes in crosstalk noise from neighbouring lines entering and exiting LPMs. For example, prior LPM methods at least do not assure that legacy lines will be protected to guarantee that no retrains will occur.

SUMMARY

One objective and improvement discussed herein is to provide a low power mode that meets the following (conflicting) service requirements:
1. Very Fast exit from L2 Mode (e.g., 1-2 seconds). This requirement results in application requirements related to user experience. The most common example is a user turning on a television which requires an immediate HDTV data stream. It is generally expected by users that it will take no more than 1-2 seconds for a TV to turn on after the button on the remote control is pressed.
2. To not cause excess fluctuating (non-stationary) crosstalk/noise onto neighboring telephone lines when exiting the Low Power mode. When a transceiver exits Low Power Mode it can increase the transmit power levels and this can cause an increase in crosstalk to neighboring lines. This increase in crosstalk can cause these other lines to experience bit errors or even retrain. Clearly this is not acceptable to a DSL service provider.

Prior methods for Low Power Modes attempt to address these issues but all fail in one significant respect: they don't address legacy (deployed) systems. In other words, it is not difficult to design a new Low Power mode that meets these requirements by defining new LPM functionality and features that can be implemented in new systems that have not been deployed yet. The problem is that there are millions of deployed DSL systems that do not have the new functionality and cannot be upgraded to add the new LPM functionality and features. In particular, requirement (2) is a significant problem for these existing deployed systems because existing deployed systems are generally not able to operate in a stable manner when there are large changes in the levels of crosstalk noise.

Some exemplary benefits of the technology disclosed herein include:
1. Meets application data rate requirements for very fast exit (1-2 seconds). For example, an L2 Mode Policy and/or LPM procedures assures that the L2 Exit Data Rate can meet application requirements.
2. Avoids retrains on legacy deployed systems. Assures stability of legacy systems by, for example, using a new L2 Mode Policy and/or LPM procedures that limit the ΔPSD, and/or PSD increase or power increase of the L2 exits steps. Alternatively or in addition, it avoids large increases in crosstalk by having all subcarriers that are active during the previous L0 remain active during L2.
3. Save Power. The technique saves power by implementing a new L2 Mode Policy that maximizes the savings while meeting stability and application requirements of (1) and (2).

Any of the above aspects and further aspects may be located in a network management system or network operation device that is located inside or outside the network and/or the transceiver(s). The network operation or management device that is located inside or outside the network may be managed and/or operated by a user, consumer, service provider or power utility provider or a governmental entity.

These and other features and advantages are described in, or are apparent from, the following detailed description of the exemplary embodiments.

BRIEF DESCRIPTION OF THE DRAWINGS

The exemplary embodiments will be described in detail, with reference to the following figures, wherein.

DETAILED DESCRIPTION

Figure 1:
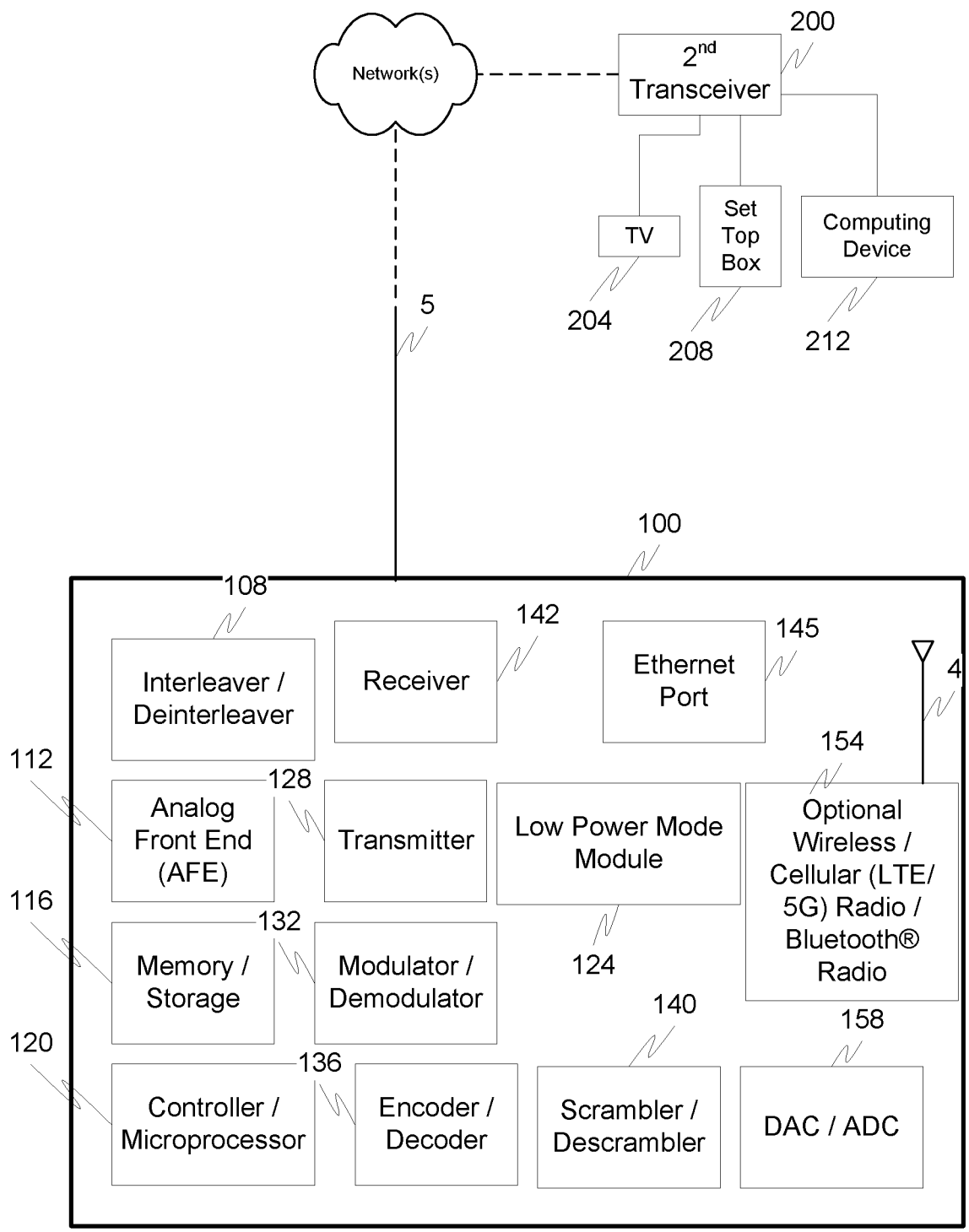
FIG. 1 illustrates an exemplary communications system with two transceivers.

The exemplary embodiments will be described in relation to communications systems, as well as protocols, techniques and methods for a low power mode in a DSL system, or in general any communications network operating using any communications protocol(s). Examples of such networks include home powerline networks, access powerline networks, home coaxial cable network, wired networks, access coaxial cable network, home telephone networks, wireless LAN networks, wireless WAN networks and access telephone networks. However, it should be appreciated that in general, the systems, methods, and techniques herein will work equally well for other types of communications environments, networks and/or protocols.

The exemplary systems and methods will also be described in relation to wired or wireless modems and/or a software and/or a hardware testing module, a telecommunications test device, or the like, a line card, a G.hn transceiver, a MOCA transceiver, a Homeplug® transceiver, a power line modem, a wired or wireless modem, a DSL modem, test equipment, a multicarrier transceiver, a wireless wide/local area network system, a satellite communications system, a network-based communications systems, such as an IP, Ethernet or ATM system, a modem equipped with diagnostic capabilities, a modem with wireless and/or network capabilities, or the like, or a separate programmed general purpose computer having a communications device that is capable of operating in conjunction with any one or more of the following communications protocols: MOCA, G.hn, Homeplug®, 802.11, 802.11x, 802.15, 802.16, or the like. However, to avoid unnecessarily obscuring the present disclosure, the following description omits well-known structures, operations and devices that may be shown in block diagram form or are otherwise summarized or known.

For purposes of explanation, numerous details are set forth in order to provide a thorough understanding of the technology. It should be appreciated however that the technology herein may be practiced in a variety of ways beyond the specific details set forth herein. Furthermore, while the exemplary embodiments illustrated herein show various components of the system collocated, it is to be appreciated that the various components of the system can be located at distant portions of a distributed network, such as a communications network, node, within a Domain Master, and/or the internet, or within a dedicated secured, unsecured, and/or encrypted system and/or within a network operation or management device that is located inside or outside the network. As an example, a Domain Master can also be used to refer to any device, system or module that manages and/or configures any one or more aspects of the network or communications environment.

Thus, it should be appreciated that the components of the system can be combined into one or more devices, or split between devices, such as a modem, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, or some combination thereof. Similarly, one or more of the functional portions of the system could be distributed between a modem and an associated computing device/system, and/or in a dedicated test and/or measurement device.

Furthermore, it should be appreciated that the various links 5, including the communications channel(s) connecting the elements can be wired or wireless links or any combination thereof, or any other known or later developed element(s) capable of supplying and/or communicating data to and from the connected elements. The term module as used herein can refer to any known or later developed hardware, software, firmware, or combination thereof, that is capable of performing the functionality associated with that element. The terms determine, calculate, and compute and variations thereof, as used herein are used interchangeable and include any type of methodology, process, technique, mathematical operational or protocol. The terms transceiver and modem are also used interchangeably herein. The terms transmitting modem and transmitting transceiver as well as receiving modem and receiving transceiver are also used interchangeably herein.

The term management interface can refer to any type of interface between a management entity and/or technician and a transceiver, such as, a CO-MIB or CPE-MIB as described, for example, in ITU standard G.997.1, which is incorporated herein by reference in its entirety.

Moreover, while some of the exemplary embodiments described herein are directed toward a transmitter portion of a transceiver performing certain functions, this disclosure is intended to include corresponding receiver-side functionality in both the same transceiver and/or another transceiver, and vice versa.

FIG. 1 illustrates an exemplary communications system that includes transceivers 100 and 200. The transceivers 100/200 are adapted to implement the technique(s) discussed herein.

In addition to well-known componentry (which has been omitted for clarity), the transceivers 100/200 each include a low power mode module 124, and optionally include one or more antennas 4, an interleaver/deinterleaver 108, an analog front end (AFE) 112, memory/storage 116, scrambler/descrambler 140, controller/microprocessor 120, transmitter 128, modulator/demodulator 132, encoder/decoder 136, receiver 142, DAC/ADC 158 (Analog to Digital and Digital to Analog Converter), ethernet port 145 and optionally one or more radios such as the cellular radio/Bluetooth®/Bluetooth® low energy radio 154. The various elements in the transceivers 100/200 are connected by one or more links (not shown, again for sake of clarity). The functional blocks, e.g., scrambler, encoder, modulator, etc., help to provide the highest performance in combination with other transceiver componentry, e.g., the equalizer, amplifier, and echo canceller (not shown). On the receiver side at the descrambler the inverse operations are performed in order to recover the transmitted payload data.

In addition to wired communications over the communications channel 5, the transceivers 100/200 can optionally have one more antennas 4, for use in wireless communications such as multi-input multi-output (MIMO) communications, Bluetooth®, etc. The antennas 4 can include, but are not limited to directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users.

The communication channel 5 generally interacts with an Analog Front End (AFE) 112, which enables the correct processing of a received modulated signal over the communications channel 5. The AFE 112 converts a received analog signal into a digital signal for processing.

The transceivers 100/200 can also each include a controller/microprocessor 120 and a memory/storage 116. The transceivers 100/200 can interact with the memory/storage 116 which may store information and operations necessary for configuring and transmitting or receiving the information described herein. The memory/storage 116 may also be used in connection with the execution of application programming or instructions by the controller/microprocessor 120, and for temporary or long term storage of program instructions and/or data. As examples, the memory/storage 120 may comprise a computer-readable device, RAM, ROM, DRAM, SDRAM and/or other storage device(s) and/or media.

The controller/microprocessor 120 may comprise a general purpose programmable processor or controller for executing application programming or instructions related to the transceiver 100. Further, the controller/microprocessor 120 can perform operations for configuring and transmitting information as described herein. The controller/microprocessor 120 may include multiple processor cores, and/or implement multiple virtual processors. Optionally, the controller/microprocessor 120 may include multiple physical processors. By way of example, the controller/microprocessor 120 may comprise a specially configured Application Specific Integrated Circuit (ASIC) or other integrated circuit, a digital signal processor, a controller, a hardwired electronic or logic circuit, a programmable logic device or gate array, a special purpose computer, or the like.

The transceivers 100/200 can further each include a transmitter 128 and receiver 142 which can transmit and receive signals, respectively, to and from other devices.

The transceivers 100/200 can also optionally contain a security module (not shown). This security module can contain information regarding but not limited to, security parameters required to connect the transceiver 100 to a wireless device or to an access point or other device or other available network(s), and can include WEP or WPA security access keys, network keys, etc. The WEP security access key is a security password used by Wi-Fi networks. Knowledge of this code can enable a wireless device to exchange information with the access point. The information exchange can occur through encoded messages with the WEP access code often being chosen by the network administrator. WPA is an added security standard that is also used in conjunction with network connectivity with stronger encryption than WEP.

Additionally, the transceiver 200 can be connectable to one or more devices, such as a TV 204, set top box 208, mobile device, tablet, smartphone, computing device 212, one or more Internet of Things (IoT) devices, etc., and in general any device capable of being connected to transceiver 200. As discussed, any one or more of these devices is capable of communication information regarding, for example, whether they are tuned on or off, whether an application(s) is active or inactive, and/or information regarding bandwidth requirements to the low power mode module. For example, a smartphone, or remote control, could indicate, directly or indirectly, to a transceiver that the user has requested streaming of a high-definition video stream with a 3:52 duration. The transceivers may know the duration of the video stream can manage the L2 mode as appropriate based thereon. Additionally, or alternatively, one or more of the transceivers, cooperating with the low power module and processor, can monitor a change in bandwidth consumption of one or more of the TV, Set top box, computing device, etc. This determined change in bandwidth can also be used to enter/exit the L2 Mode as discussed herein.

Furthermore, a user experience is improved because the low power mode exit is completed in, for example, less than 2 seconds. In an exemplary embodiment a new L2 Mode Policy for the transceiver 100 is specified. The L2 Mode Policy uses one or more of the following parameters (or information indicating these parameters):

1. L2-TARATPR: Target Aggregate Transmit Power Reduction in L2 (in dB).
2. L2-ETR-MIN: Minimum Expected Throughput (ETR) during L2 (in kbit/s).
3. MINDR-FS: Minimum Data Rate (or ETR) after the First L2 Exit Step. This data rate (or ETR) is based on application data rate requirements. For example, it could be set to 5 Mbps to support a video stream when a user turns on the television.
4. MAX$\Delta$PSD-PS: Maximum Delta PSD Per Step for each L2 Entry or Exit step. This will depend on the CO-MIB configurations of legacy systems. For example, this value could be set to 3 dB if the legacy system has SRA_DOWNSHIFT_MARGIN=3 dB.
5. MINTIME-PS: Minimum Time Per Step Time between each L2 Entry or Exit step. This may depend on SRA reaction time of legacy systems. For example, this value could be set to 40 seconds to allow a legacy system to perform a full band SRA.
6. MAXSTEPS: Maximum number of steps for L2 Entry or L2 exit.

The transceiver 100 may receive one or more of these parameters (or information indicating these parameters) from a DSL management entity or interface such as a CO-MIB or a DSL control entity such as a Vectoring Control Entity (VCE), or the like (not shown).

The transceiver 100 may transmit using transmitter 128 or receive using receiver 142 one or more of these parameters (or information indicating these parameters) from a second transceiver, with comparable componentry, in a message transmitted during initialization.

The transceiver 100 may transmit or receive one or more of these parameters (or information indicating these parameters) from a second transceiver in a message transmitted during SHOWTIME (also known as steady state transmission or user data transmission mode). The message could be an EOC message, where an EOC message is a message that is transmitted or received over the Embedded Operations Channel (EOC).

Alternatively, or in addition, the transceiver 100 with the cooperation of the low power module 124 and processor 120 may determine these parameters (or information indicating these parameters). Alternatively a VCE may determine these parameters (or information indicating these parameters).

According to one exemplary aspect, the transceiver 100 transmits or receives one or more of these parameters (or information indicating these parameters) prior to entering into the L2 mode. Therefore the transceiver 100 can determine the transmission parameters used in L2 (e.g., at least one of a data rate, power levels, PSD levels, bit allocation table, fine gain table, etc.) based on these one or more parameters.

In one exemplary embodiment, these parameters (or information indicating these parameters) are updated or changed during user data transmission mode or SHOWTIME. This could be done via the CO-MIB or by the VCE or autonomously by the transceiver 100 with the cooperation of the low power mode module 124. In this case, for example, a message(s) could be transmitted or received by the transceiver 100 during the user data transmission mode or SHOWTIME. The updating could be done based on one or more of the following:

A change in crosstalk noise conditions,
A change in noise conditions,
The addition or removal of service on a neighbouring telephone line,
The addition or removal of service on a line in a vectored group, and
The addition or removal of applications such as HDTV channels, or the like.

Alternatively, or in addition, one or more of the messages described herein (e.g., an initialization message and/or an EOC message and/or a first message that is used to initiate the L2 mode entry), which is determined by the low power mode module 124, further comprises information indicating whether (or not) a transceiver during L2 is allowed to disable subcarriers that are active during the previous L0. For example, a bit could in a message could be used to indicate this—if this bit is set to 1, the transceiver is allowed to disable (or make inactive) subcarriers during the L2 mode, if the bit is set to 0, the transceiver is not allowed to disable (or make inactive) subcarriers during the L2 mode. Disabling a subcarrier in this case means, for example, to not allocate any power to that subcarrier or, for example, to set the fine gain value of that subcarrier to 0. Disabled subcarriers are also known as inactive subcarriers.

The L2 Mode Policy

In one exemplary embodiment, the transceiver 100 performs at least the following during L2:
1. Determine at least one of a bit loading table during L2, framing parameters during L2 and APSD during L2 based on one or more of the constraints:
    ETR≥L2-ETR-MIN,
    Data Rate after the first L2 exit step≥MINDR-FS,
    Delta PSD of each L2 exit step≤MAXΔPSD-PS,
    Impulse Noise Protection=same as in L0, and
    Alpha-Beta Delays 6 ms.
2. After these constraints are met, the transceiver may additionally perform one of the following:
    Maximize the Aggregate Transmit Power Reduction in L2 until a L2-TARATPR, and
    Maximize the L2 Margin until MAXSNRM.

Exemplary L2 Entry Method for Transceiver 100

A first transceiver and a second transceiver (each with componentry similar to that illustrated in FIG. 1) are operating in L0 (full power or normal power mode) with a current data rate of, for example, 20 Mbps. For example, the current data rate could be used for 3 HDTV channels requiring 5 Mbps each and the remaining 5 Mbps (20−2× 5=15 Mbps) could be used for internet access, Voice over IP telephone (VoIP) service, etc.

The first transmitting transceiver (the transmitting transceiver) or the second transceiver (the receiving transceiver) determines that data rate can be reduced because the user is not using at least one application that requires operation at the current data rate. This determination could be done, for example, by monitoring primitives or packets or cells coming from the upper layer. For example, the transceiver could determine that all 3 HDTV channels are inactive and that internet access is not being used. When this occurs, the L2 Entry method may be initiated. Alternatively, or in addition, a transceiver is in communication with to at least one video monitoring device (such as a TV or a computer monitor) or is in communication with a device, such as a set top device, that is connected to at least one video monitoring device (such as a TV or a computer monitor). When a user stops watching a video (e.g., turns off a TV or terminates a video streaming application, etc.), the transceiver would initiate the L2 Mode entry methods describe herein.

The L2 Entry includes one or more of the following steps in this order (or in a different order):
1. Prior to entering L2, the first transceiver 100 sends an initialization message or EOC message to the second transceiver 200 that includes one or more of the following parameters: L2-TARATPR, L2-ETR-MIN, MINDR-FS, MAXΔPSD-PS, MINTIME-PS, MAXSTEPS. Alternatively, or in addition, the initialization message or EOC message could include information indicating whether (or not) a transceiver during L2 is allowed to disable one or more subcarriers that were active during the previous L0.
2. The first transceiver 100 initiates an L2 entry step by sending a first message and waits for acknowledgement. This first message may be repeated until acknowledgement is received. The first message may indicate the L2 Entry Step Number (from 1 to MAXSTEPS). The initial value of the L2 Entry Step Number can be 1. Alternatively or in addition, this first message includes one or more of the following parameters: L2-TARATPR, L2-ETR-MIN, MINDR-FS, MAXΔPSD-PS, MINTIME-PS, MAXSTEPS. Alternatively, or in addition, the first message could include information indicating whether (or not) a transceiver during L2 is allowed to disable one or more subcarriers that were active during the previous L0.
3. Upon receipt of the first message, the second transceiver 200 uses at least one of the parameters received in the first message or the initialization message or the EOC message to determine transmission or reception parameters during L2. For example, the second transceiver 200 could determine one more of a data rate during L2, a PSD level for at least one subcarrier during L2, a bit allocation value for at least one subcarrier during L2, a framing parameter during L2, a fine gain value for at least subcarrier during L2, based on a least one of a L2-TARATPR, L2-ETR-MIN, MINDR-FS, MAXΔPSD-PS, MINTIME-PS, MAXSTEPS. The second transceiver 200 acknowledges the first message by transmitting a second message within 128 ms indicating one or more of a bit loading table, at least one bit allocation value and at least one framing parameters for the L2 entry step. In one exemplary embodiment, the parameters indicated in the message meet the constraints of the L2 Mode Policy described above. Alternatively, or in addition, based on information received in a previous message the transceiver may not be allowed to disable any subcarriers, or at least one subcarrier, that are active during the previous L0. In this case, the bit loading table may not include any disabled subcarriers (bi=0 and gi=0) and when a subcarrier is not able to carry any bits due to the expected ΔPSD, the subcarrier may be, for example, converted or turned into a monitored subcarrier (bi=0 and gi>0). (bi is the number of bits that can be transmitted over an $i^{th}$ subchannel/subcarrier/carrier and gi is a subchannel/ subcarrier/carrier gain or fine gain)
4. Upon reception of the second message, the first transceiver 100 acknowledges the second message with, for example, a L2-SYNCHRO pattern within 128 ms. In one exemplary embodiment, the message comprises one inverted sync symbol followed by a pattern of 9 sync symbols. In general, a signal comprising at least one predefined signal such as a sync symbol can be used as a L2-SYNCHRO pattern.
5. Starting from the first symbol following the first L2 SYNCHRO pattern, both the first transceiver and the second transceiver apply the bit loading and/or framing parameters indicated in the second message. The first transceiver does not change the transmit PSD level at this point in time.
6. Upon reception of the first L2-SYNCHRO pattern, the second transceiver 200 acknowledges the first L2 SYNCHRO pattern by sending a third message within 64 ms. The third message indicates at least the APSD that the second transceiver 200 wants to apply to fit the bit loading and/or framing parameters of the second message. The ΔPSD at least satisfies the condition: ΔPSD≤MAXΔPSD-PS.

7. Upon receiving the third message, the first transceiver 100 acknowledges the third message by sending a second L2-SYNCHRO pattern within 128 ms.
8. Starting from the first symbol after the second L2 SYNCHRO pattern, both the first transceiver 100 and the second transceiver 200 apply the ΔPSD indicated in the third message.
9.
    a. If L2 Entry Step Number is equal to MAXSTEPS, then the L2 entry procedure ends and the VTUs are in L2.
    b. If the L2 Entry Step Number is less than MAXSTEPS, then the first transceiver 100 increments the L2 Entry Step Number by 1. The first transceiver 100 waits at least MINTIME-PS and then initiates a new L2 entry step by sending a fourth message and waits for acknowledgement. This fourth message may be repeated until acknowledgement is received. The fourth message indicates the updated L2 Entry step number.
10. Upon receipt of the fourth message, the second transceiver 200 rejects or acknowledges the fourth message:
    a. Reject: If it is not possible to further decrease the transmit power within the L2 Mode Policy constraints, the second transceiver 200 rejects the fourth message by transmitting a fifth message. The fifth message rejects the fourth message. In this case, the L2 Entry procedure ends and the second transceiver 200 is now in L2.
    b. Acknowledge: If it is still possible to decrease the transmit power within the L2 Mode Policy constrains, the second transceiver 200 goes back to Step 3 of the L2 Entry procedure and repeats the remaining steps.
11. Upon receipt of the fourth message, the L2 Entry procedure ends and the first transceiver is now in L2.

Exemplary L2 Exit Method

A first transceiver 100 and a second transceiver 200 are operating in L2 with a current L2 data rate of for, example, 256 kbps, or in general at any data rate. For example, the current data rate could be used for Voice over IP and keep alive or heartbeat signals.

The first transmitting transceiver 100 (the transmitting transceiver) or the second transceiver 200 (the receiving transceiver) determines that data rate needs to be increased because the user has turned on at least one application that requires operation at a higher data rate than the current L2 data rate (for example a user has turned on a television or began watching a streaming video). This determination could be done, for example, by monitoring primitives and/or packets and/or cells coming from the upper layer. For example, the transceiver 100 could determine that a HDTV channel has been turned on (or activated) and the channel requires at least 5 Mbps. When this occur the L2 Exit method may be initiated.

1. The first transceiver 100 initiates an L2 exit step by sending a first message and waiting for acknowledgement. This first message may be repeated until an acknowledgement is received. The first message indicates the L2 Exit step number (from 1 to MAXSTEPS). The initial value of the L2 Exit step number can be 1. Alternatively or in addition, this first message includes one or more of the following parameters: L2-TARATPR, L2-ETR-MIN, MINDR-FS, MAXΔPSD-PS, MINTIME-PS, MAXSTEPS.
2. Upon reception of the first message, the second transceiver 200 acknowledges the first message with a second message within 128 ms. The second message may indicate, for example, the ΔPSD that the second transceiver wants to apply. The ΔPSD satisfies the condition: ΔPSD≤MAXΔPSD-PS. After sending the second message, the second transceiver 200 expects to receive the first L2-SYNCHRO pattern during the following 128 ms.
3. Upon reception of the second message, the first transceiver 100 acknowledges the second message command with a L2-SYNCHRO pattern within 128 ms. In one exemplary embodiment, one inverted sync symbol is followed by a pattern of 9 sync symbols. In general, any signal comprising at least one sync symbol can be used as an L2-SYNCHRO pattern.
4. Starting from the first symbol following the L2-SYNCHRO pattern, both the first transceiver 100 and the second transceiver 200 apply the ΔPSD trim indicated in the L2-ΔPSD-Request. The first transceiver does not change the bit loading table and the framing parameters at this point in time.
5. Upon reception of the L2-SYNCHRO pattern, the second transceiver 200 estimates the SNR and acknowledges the first L2-SYNCHRO pattern by sending a third message within 64 ms. The third message indicates at least the bit loading and framing parameters that fit the applied ΔPSD. The bit loading table and framing parameters at least satisfy the condition: Data Rate after the first L2 exit step≥MINDR-FS. Alternatively or in addition, based on information received in a previous message, the transceiver may not be allowed to disable at least one subcarrier or any subcarriers that are active during the previous L0. In this case, the bit loading table may not include any disabled subcarriers (bi=0 and gi=0) and when a subcarrier is not able to carry any bits due to the expected ΔPSD, the subcarrier is converted to a monitored subcarrier (bi=0 and gi>0).
6. Upon receiving the third message, the first transceiver 100 acknowledges the third message by sending the second L2-SYNCHRO pattern within 128 ms.
7. Starting from the first symbol after the second L2-SYNCHRO pattern, both the first transceiver 100 and the receiving second transceiver apply the bit loading and/or framing parameters indicated in the third message.
8.
    a. If L2 Exit Step Number is equal to MAXSTEPS, then the L2 exit procedure ends and the VTUs are in L0.
    b. If the L2 Exit Step Number is less than MAXSTEPS, then the first transceiver 100 increments the L2 Exit Step Number by 1. The first transceiver 100 waits at least MINTIME-PS and then initiate a new L2 exit step by sending a fourth message and waits for acknowledgement. This fourth message may be repeated until an acknowledgement is received. The fourth message indicates the updated L2 Exit step number.
9. Upon receipt of the fourth message, the second transceiver 200 may reject or acknowledge the fourth message:
    a. Reject: If the current PSD, bit loading table, and framing parameters meet the L0 Policy, the second transceiver 200 rejects the fourth message by transmitting a fifth message. In this case the L2 exit procedures ends and the second transceiver is now in L0.

b. Acknowledge: If the second transceiver 200 has not yet met the requirements of the L0 Policy, the second transceiver 200 goes back to Step 3 of the L2 Entry procedure and repeats the remaining steps.

10. Upon receipt of the fifth message, the L2 Exit procedure ends and the first transceiver 100 is now in L0.

Figure 2:
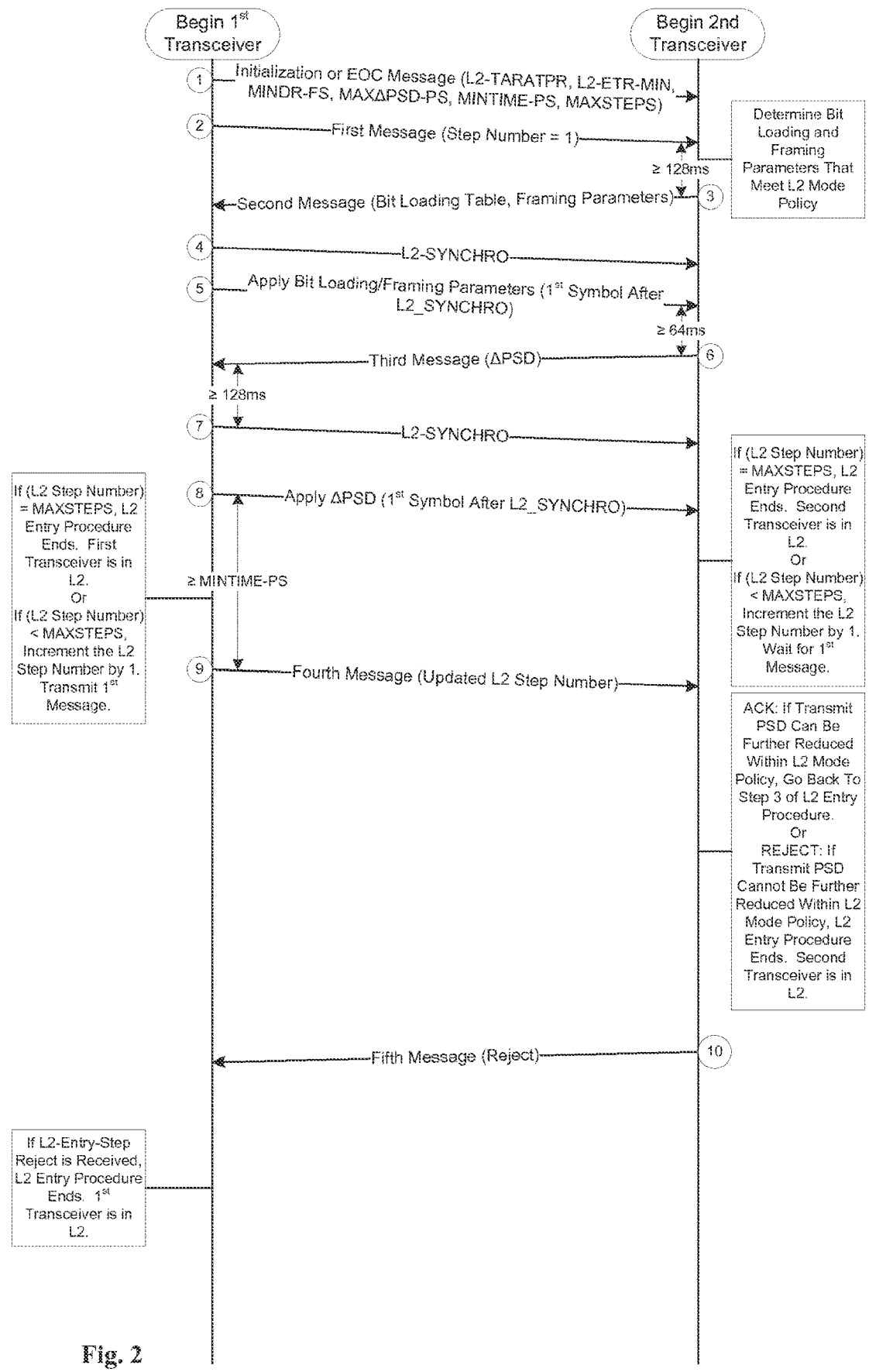
FIG. 2 illustrates the flow between a first and a second transceiver for entering a low power mode.

FIG. 2 illustrates an exemplary method for entering a low power mode. More specifically, and as discussed above, a new L2 Mode Policy is specified. The L2 Mode Policy uses one or more of the following parameters (or information indicating these parameters):

1. L2-TARATPR: Target Aggregate Transmit Power Reduction in L2 (in dB).
2. L2-ETR-MIN: Minimum Expected Throughput during L2 (in kbit/s).
3. MINDR-FS: Minimum Data Rate (or ETR) after the First L2 Exit Step. This data rate is based on application data rate requirements. For example, the data rate could be set to 5 Mbps to support a video stream when a user turns on the television.
4. MAX$\Delta$PSD-PS: Maximum Delta PSD Per Step for each L2 Entry or Exit step. This will depend on the CO-MIB configurations of legacy systems. For example, this value could be set to 3 dB if the legacy system has SRA_DOWNSHIFT_MARGIN=3 dB.
5. MINTIME-PS: Minimum Time Per Step Time between each L2 Entry or Exit step. This will depend on SRA reaction time of legacy systems. For example, this value could be set to 40 seconds to allow a legacy system to perform a full band SRA.
6. MAXSTEPS: Maximum number of steps for L2 Entry or L2 exit.

A transceiver may optionally receive one or more of these parameters (or information indicating these parameters) from a DSL management entity or interface such as a CO-MIB or a DSL control entity such as a Vectoring Control Entity (VCE), or the like (not shown).

Alternatively, or in addition, a transceiver may transmit or receive one or more of these parameters (or information indicating these parameters) to/from a second transceiver in a message transmitted during initialization.

Alternatively, or in addition, the transceiver may transmit or receive one or more of these parameters (or information indicating these parameters) from a second transceiver in a message transmitted during SHOWTIME (also known as steady state transmission or user data transmission mode). The message could be an EOC message, where an EOC message is a message that is transmitted or received over the Embedded Operations Channel (EOC).

Alternatively, or in addition, the transceiver may determine these parameters (or information indicating these parameters). Alternatively a VCE may determine these parameters (or information indicating these parameters).

According to one aspect, the transceiver transmits or receives one or more of these parameters (or information indicating these parameters) prior to entering into the L2 mode. Therefore the transceiver can determine the transmission parameters used in L2 (e.g., at least one of a data rate, power levels, PSD levels, bit allocation table, fine gain table, etc.) based on these one or more parameters.

In one exemplary embodiment, these parameters (or information indicating these parameters) are updated or changed during user data transmission mode or SHOWTIME. This could be done via the CO-MIB or by the VCE or autonomously by the transceiver. In this case, for example, a message(s) could be transmitted or received by the transceiver during the user data transmission mode or SHOWTIME. The updating could be done based on one or more of the following:

A change in crosstalk noise conditions,
A change in noise conditions,
The addition or removal of service on a neighbouring telephone line,
The addition or removal of service on a line in a vectored group, and
The addition or removal of applications such as HDTV channels, or the like.

Alternatively, or in addition, one or more of the messages described herein (e.g., an initialization message and/or an EOC message and/or a first message that is used to initiate the L2 mode entry) further comprises information indicating whether (or not) a transceiver during L2 is allowed to disable subcarriers that are active during the previous L0. For example, a bit could in a message could be used to indicate this—if this bit is set to 1, the transceiver is allowed to disable subcarriers during the L2 mode, if the bit is set to 0, the transceiver is not allowed to disable subcarrier during L2 mode. Disabling a subcarrier in this case means, for example, to not allocate any power to that subcarrier or, for example, to set the fine gain value of that subcarrier to 0.

The L2 Mode Policy

In one exemplary embodiment, the transceiver performs at least the following during L2:

1. Determine at least one of a bit loading table during L2, framing parameters during L2 and $\Delta$PSD during L2 based on one or more of the constraints:
   ETR$\geq$L2-ETR-MIN,
   Data Rate after the first L2 exit step$\geq$MINDR-FS,
   Delta PSD of each L2 exit step$\leq$MAX$\Delta$PSD-PS,
   Impulse Noise Protection=same as in L0, and
   Alpha-Beta Delays 6 ms.
2. After these constraints are met, the transceiver may additionally perform one of the following:
   Maximize the Aggregate Transmit Power Reduction in L2 until a L2-TARATPR, and
   Maximize the L2 Margin until MAXSNRM.

Exemplary L2 Entry Methodology

A first transceiver and a second transceiver are operating in L0 (full power or normal power mode) with a current data rate of, for example, 20 Mbps. For example, the current data rate could be used for 3 HDTV channels requiring 5 Mbps each and the remaining 5 Mbps (20−2×5=15 Mbps) could be used for internet access, Voice over IP telephone (VoIP) service, etc.

The first transmitting transceiver (the transmitting transceiver) or the second transceiver (the receiving transceiver) determines that data rate can be reduced because the user is not using at least one application that requires operation at the current data rate. This determination could be done, for example, by monitoring primitives and/or packets and/or cells coming from the upper layer. For example, the transceiver could determine that all 3 HDTV channels are inactive and that internet access is not being used. When this occurs, the L2 Entry method may be initiated. The L2 Entry includes one or more of the following steps in this order (or in a different order):

Step 1. The first transceiver sends an initialization message or EOC message to the second transceiver that includes one or more of the following parameters: L2-TARATPR, L2-ETR-MIN, MINDR-FS, MAX$\Delta$PSD-PS, MINTIME-PS, MAXSTEPS. Alternatively, or in addition, the initialization message or EOC message could include information indicating whether (or not) a transceiver during L2 is allowed to disable subcarriers that were active during the previous L0.

Step 2. The first transceiver initiates an L2 entry step by sending a first message and waits for acknowledgement. This first message may be repeated until acknowledgement is received. The first message indicates the L2 Entry Step Number (from 1 to MAXSTEPS). The initial value of the L2 Entry Step Number can be 1. Alternatively, or in addition, this first message includes one or more of the following parameters: L2-TARATPR, L2-ETR-MIN, MINDR-FS, MAX$\Delta$PSD-PS, MINTIME-PS, MAXSTEPS. Alternatively, or in addition, the first message could include information indicating whether (or not) a transceiver during L2 is allowed to disable subcarriers that were active during the previous L0.

Step 3. Upon receipt of the first message, the second transceiver uses at least one of the parameters received in the first message or the initialization message or the EOC message to determine transmission or reception parameters during L2. For example, the second transceiver could determine one more of a data rate during L2, a PSD level for at least one subcarrier during L2, a bit allocation value for at least one subcarrier during L2, a framing parameter during L2, a fine gain value for at least subcarrier during L2, based on a least one of a L2-TARATPR, L2-ETR-MIN, MINDR-FS, MAX$\Delta$PSD-PS, MINTIME-PS, MAXSTEPS. The second transceiver acknowledges the first message by transmitting a second message within 128 ms indicating one or more of a bit loading table, at least one bit allocation value and at least one framing parameters for the L2 entry step. In one exemplary embodiment, the parameters indicated in the message meet the constraints of the L2 Mode Policy described above. Alternatively, or in addition, based on information received in a previous message the transceiver may not be allowed to disable at least one subcarrier that is active during the previous L0. In this case, the bit loading table may not include any disabled subcarriers (bi=0 and gi=0) and when a subcarrier is not able to carry any bits due to the expected $\Delta$PSD, the subcarrier may be, for example, converted or turned into a monitored subcarrier (bi=0 and gi>0).

Step 4. Upon reception of the second message, the first transceiver acknowledges the second message with, for example, a L2-SYNCHRO pattern within 128 ms. In one exemplary embodiment, the message comprises one inverted sync symbol followed by a pattern of 9 sync symbols. In general, a signal comprising at least one predefined signal such as a sync symbol can be used as a L2-SYNCHRO pattern.

Step 5. Starting from the first symbol following the first L2 SYNCHRO pattern, both the first transceiver and the second transceiver apply the bit loading and/or framing parameters indicated in the second message. The first transceiver does not change the transmit PSD level at this point in time.

Step 6. Upon reception of the first L2-SYNCHRO pattern, the second transceiver acknowledges the first L2 SYNCHRO pattern by sending a third message within 64 ms. The third message indicates at least the $\Delta$PSD that the second transceiver wants to apply to fit the bit loading and/or framing parameters of the second message. The $\Delta$PSD at least satisfies the condition: $\Delta$PSD$\leq$MAX$\Delta$PSD-PS.

Step 7. Upon receiving the third message, the first transceiver acknowledges the third message by sending a second L2-SYNCHRO pattern within 128 ms.

Step 8. Starting from the first symbol after the second L2 SYNCHRO pattern, both the first transceiver and the second transceiver apply the $\Delta$PSD indicated in the third message.

Step 9.
 a. If L2 Entry Step Number is equal to MAXSTEPS, then the L2 entry procedure ends and the VTUs are in L2.
 b. If the L2 Entry Step Number is less than MAXSTEPS, then the first transceiver increments the L2 Entry Step Number by 1. The first transceiver waits at least MINTIME-PS and then initiates a new L2 entry step by sending a fourth message and waits for acknowledgement. This fourth message may be repeated until acknowledgement is received. The fourth message indicates the updated L2 Entry step number.

Step 10. Upon receipt of the fourth message, the second transceiver rejects or acknowledges the fourth message:
 a. Reject: If it is not possible to further decrease the transmit power within the L2 Mode Policy constraints, the second transceiver rejects the fourth message by transmitting a fifth message. The fifth message rejects the fourth message. In this case, the L2 Entry procedure ends and the second transceiver is now in L2.
 b. Acknowledge: If it is still possible to decrease the transmit power within the L2 Mode Policy constrains, the second transceiver goes back to Step 3 of the L2 Entry procedure and repeat the remaining steps.

Step 11. Upon receipt of the fourth message, the L2 Entry procedure ends and the first transceiver is now in L2.

Exemplary L2 Exit Methodology

A first transceivers and a second transceiver are operating in L2 with a current L2 data rate of for, example, 256 kbps. For example, the current data rate could be used for Voice over IP and keep alive or heartbeat signals.

The first transmitting transceiver (the transmitting transceiver) or the second transceiver (the receiving transceiver) determines that data rate needs to be increased because the user has turned at least one application that requires operation at a higher data rate than the current L2 data rate. This determination could be done, for example, by monitoring primitives or packets or cells coming from the upper layer. For example, the transceiver could determine that a HDTV channel has been turned on (or activated) and the channel requires at least 5 Mbps.

Alternatively, or in addition, the transceiver is in communication with at least one video/data monitoring device (such as one or more of a TV, a computing device, tablet, a set top box, or a computer monitor, or the like) or is in communication with a device, such as a set top device, that is connected to at least one video monitoring device (such as a TV or a computer monitor). When a user begins watching a video, i.e., consuming data, (e.g. turns on a TV or initiate a video streaming application etc), the transceiver would initiate the L2 Mode exit methods describe herein.

Figure 3:
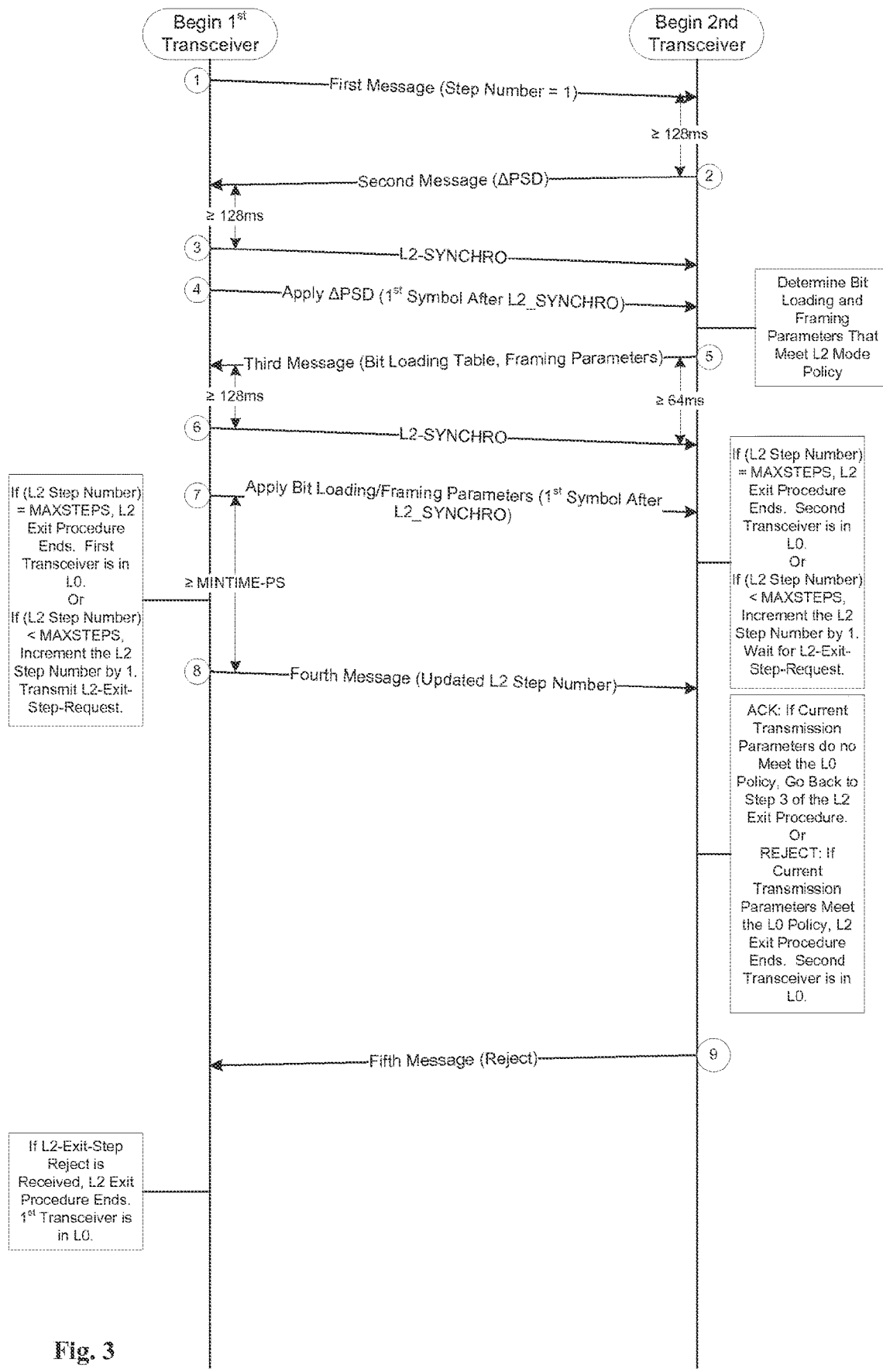
FIG. 3 illustrates the flow between a first and a second transceiver for exiting a low power mode.

When this occur the L2 Exit method may be initiated as shown in FIG. 3.

Step 1. The first transceiver initiates an L2 exit step by sending a first message and waiting for acknowledgement. This first message may be repeated until an acknowledgement is received. The first message indicates the L2 Exit step number (from 1 to MAXSTEPS). The initial value of the L2 Exit step number can be 1. Alternatively, or in addition, this first message includes one or more of the following parameters: L2-TARATPR, L2-ETR-MIN, MINDR-FS, MAXΔPSD-PS, MINTIME-PS, MAXSTEPS.

Step 2. Upon reception of the first message, the second transceiver acknowledges the first message with a second message within 128 ms. The second message may indicate, for example, the ΔPSD that the second transceiver wants to apply. The ΔPSD satisfies the condition: ΔPSD≤MAXΔPSD-PS. After sending the second message, the second transceiver expects to receive the first L2-SYNCHRO pattern during the following 128 ms.

Step 3. Upon reception of the second message, the first transceiver acknowledges the second message command with a L2-SYNCHRO pattern within 128 ms. In one exemplary embodiment, one inverted sync symbol is followed by a pattern of 9 sync symbols. In general, any signal comprising at least one sync symbol can be used as an L2-SYNCHRO pattern.

Step 4. Starting from the first symbol following the L2-SYNCHRO pattern, both the first transceiver and the second transceiver apply the ΔPSD trim indicated in the L2-ΔPSD-Request. The first transceiver does not change the bit loading table and the framing parameters at this point in time.

Step 5. Upon reception of the L2-SYNCHRO pattern, the second transceiver estimates the SNR and acknowledges the first L2-SYNCHRO pattern by sending a third message within 64 ms. The third message indicates at least the bit loading and framing parameters that fit the applied ΔPSD. The bit loading table and framing parameters at least satisfy the condition: Data Rate after the first L2 exit step≥MINDR-FS. Alternatively, or in addition, based on information received in a previous message, the transceiver may not be allowed to disable any subcarriers that are active during the previous L0. In this case, the bit loading table will not include any disabled subcarriers (bi=0 and gi=0) and when a subcarrier is not able to carry any bits due to the expected ΔPSD, the subcarrier is converted to a monitored subcarrier (bi=0 and gi>0).

Step 6. Upon receiving the third message, the first transceiver acknowledges the third message by sending the second L2-SYNCHRO pattern within 128 ms.

Step 7. Starting from the first symbol after the second L2-SYNCHRO pattern, both the first transceiver and the receiving second transceiver apply the bit loading and/or framing parameters indicated in the third message.

Step 8.
 a. If L2 Exit Step Number is equal to MAXSTEPS, then the L2 exit procedure ends and the VTUs are in L0.
 b. If the L2 Exit Step Number is less than MAXSTEPS, then the first transceiver increments the L2 Exit Step Number by 1. The first transceiver waits at least MINTIME-PS and then initiate a new L2 exit step by sending a fourth message and waits for acknowledgement. This fourth message may be repeated until an acknowledgement is received. The fourth message indicates the updated L2 Exit step number.

Step 9. Upon receipt of the fourth message, the second transceiver may reject or acknowledge the fourth message:

a. Reject: If the current PSD, bit loading table, and framing parameters meet the L0 Mode Policy, the second transceiver rejects the fourth message by transmitting a fifth message. In this case the L2 exit procedures ends and the second transceiver is now in L0.
 b. Acknowledge: If the second transceiver has not yet met the requirements of the L0 Mode Policy, the second transceiver goes back to Step 3 of the L2 Entry procedure and repeats the remaining steps.

Step 10. Upon receipt of the fifth message, the L2 Exit procedure ends and the first transceiver is now in L0.

When a message described above indicates a parameter, this message may contain a bit field comprising the parameter value. Alternately this message may contain information that can be used to determine that parameter value.

The first transceiver may be a central office (CO) transceiver, customer premises equipment, a VTU (VDSL transmission unit), an ATU (ADSL transmission unit), an FTU (G.fast transmission unit), a wireless device, etc.

The second transceiver may be a central office (CO) transceiver, customer premises equipment, a VTU (VDSL transmission unit), an ATU (ADSL transmission unit), an FTU (G.fast transmission unit), a wireless device, etc.

The terms bit loading table or bit allocation table (BAT) are used interchangeably herein.

The terms L2 and LPM are used interchangeably herein.

The terms subcarrier and subchannel are used interchangeably herein.

The terms message and command are used interchangeably herein.

The terms expected throughput (ETR) and data rate are used interchangeably herein.

Additionally, while some of the exemplary steps are illustrated as having a specific time interval therebetween, it is to be appreciated that these time intervals can be changed to any duration(s). Additionally, one or more of the illustrated steps can be optional and may be skipped. Additionally, the illustrated steps can be performed in a different order than described above.

The exemplary embodiments are described in relation to LPM in an xDSL environment. However, it should be appreciated, that in general, the systems and methods herein will work equally well for any type of communication system in any environment including wireless, powerline, coaxial cable and/or fiber optic cables.

The exemplary systems and methods are described in relation to multicarrier modems, such as ADSL modems and VDSL modems, and associated communication hardware, software and communication channels. However, to avoid unnecessarily obscuring the present disclosure, the following description omits well-known structures and devices that may be shown in block diagram form or otherwise summarized.

For purposes of explanation, numerous details are set forth in order to provide a thorough understanding of the technology. It should be appreciated however that the technology herein may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communications network and/or the Internet, or within a dedicated secure, unsecured and/or encrypted system. Thus, it should be appreciated that the components of the system can be combined into one or more devices, such as a modem, or collocated on a particular node of a distributed network, such as a telecommunications network. As will be appreciated from the following description, and for reasons of computational efficiency, the components of the system can be arranged at any location within a distributed network without affecting the operation of the system. For example, the various components can be located in a Central Office modem (CO, ATU-C, VTU-O), a Customer Premises modem (CPE, ATU-R, VTU-R), an xDSL management device, or some combination thereof. Similarly, one or more functional portions of the system could be distributed between a modem and an associated computing device.

Furthermore, it should be appreciated that the various links, including communications channel 5, connecting the elements (not shown) can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique. Transmitting modem and transmitting transceiver as well as receiving modem and receiving transceiver are used interchangeably herein. While the above-described flowcharts have been discussed in relation to a particular sequence of events, it should be appreciated that changes to this sequence can occur without materially effecting the operation of the technology. Additionally, the exact sequence of events need not occur as set forth in the exemplary embodiments, but rather the steps can be performed by one or the other transceiver in the communication system provided both transceivers are aware of the technique being used for initialization. Additionally, the exemplary techniques illustrated herein are not limited to the specifically illustrated embodiments but can also be utilized with the other exemplary embodiments and each described feature is individually and separately claimable.

The above-described system can be implemented on wired and/or wireless telecommunications devices, such a modem, a multicarrier modem, a DSL modem, an ADSL modem, an xDSL modem, a VDSL modem, a linecard, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, or the like.

The term transceiver as used herein can refer to any device that comprises hardware, software, firmware, or combination thereof and is capable of performing any of the methods described herein.

The term module as used herein can refer to any device that comprises hardware, software, firmware, or combination thereof and is operable or configurable to perform any of the methods described herein.

Additionally, the systems, methods and protocols can be implemented on one or more of a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a modem, a transmitter/receiver, any comparable means, or the like. In general, any device capable of implementing a state machine that is in turn capable of implementing the methodology illustrated herein can be used to implement the various communication methods, protocols and techniques according to this disclosure.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems herein is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software and/or firmware that can be stored on a storage medium, executed on programmed general-purpose computer with the cooperation of a controller and memory, a special purpose computer, a microprocessor, or the like. In these instances, the systems and methods can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications transceiver.

For purposes of explanation, numerous details are set forth in order to provide a thorough understanding of the present embodiments. It should be appreciated however that the techniques herein may be practiced in a variety of ways beyond the specific details set forth herein.

Additionally, the exemplary techniques illustrated herein are not limited to the specifically illustrated embodiments but can also be utilized with the other exemplary embodiments and each described feature is individually and separately claimable.

The above-described system can be implemented on a wired/wireless telecommunications device(s)/system, such as a xDSL modem and an 802.11 transceiver, or the like. Examples of wireless protocols that can be used with this technology include 802.11a, 802.11b, 802.11g, 802.11n, 802.11ac, 802.11ad, 802.11af, 802.11ah, 802.11ai, 802.11aj, 802.11aq, 802.11ax, WiFi, LTE, 4G, Bluetooth®, WirelessHD, WiGig, WiGi, 3GPP, Wireless LAN, WiMAX, and the like.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, Broadcom® AirForce BCM4704/BCM4703 wireless networking processors, the AR7100 Wireless Network Processing Unit, other industry-equivalent processors, and may perform computational functions using any known or future-developed standard, instruction set, libraries, and/or architecture.

It is therefore apparent that there has been provided systems and methods for a transceiver low power mode. While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the spirit and scope of this disclosure.

The invention claimed is:

1. A transceiver including a transmitter and a receiver, the transceiver operable to transmit or receive prior to entering a Low Power Mode from a Full or Normal Power Mode a message comprising a parameter indicating at least a minimum expected throughput after a first exit step from the Low Power Mode to the Full or Normal Power Mode, wherein the minimum expected throughput after the first exit step is less than a data rate of the Full or Normal Power Mode, and wherein the first exit step is the first step of a plurality of Low Power Mode exit steps from the Low Power Mode to the Full or Normal Power Mode.

2. The transceiver of claim 1, wherein the transceiver operates during the Low Power Mode with a condition that an expected throughput after a first exit step shall be equal to or greater than the minimum expected throughput indicated in the message preferably wherein the operating comprises determining at least one bit allocation value during Low Power Mode; wherein the operating comprises determining at least one framing parameter value during Low Power Mode.

3. The transceiver of claim 1, wherein the message is transmittable during initialization; and/or wherein the transceiver further comprises a low power mode module capable of selecting, during a Low Power Mode exit procedure, at least one transmission parameter that results in an expected throughput that is equal or greater than the minimum expected throughput indicated in the message; preferably wherein the transceiver (100, 200) further transmits a second message that comprises the at least one transmission parameter value.

4. The transceiver of claim 1, being further operable to transmit or receive prior to entering the Low Power Mode from the Full or Normal Power Mode a message indicating that the transceiver is not allowed to disable at least one subcarrier during the Low Power Mode, preferably wherein the transceiver is further operable to convert the at least one subcarrier that is not allowed to be disabled into a monitored subcarrier, in particular wherein the monitor subcarrier has a bit allocation value equal to zero.

5. The transceiver of claim 1, being further operable to transmit or receive prior to entering the Low Power Mode a message indicating that the transceiver is not allowed to disable any subcarriers during the Low Power Mode.

6. The transceiver of claim 5, further operable to convert at least one subcarrier that is not allowed to be disabled into a monitored subcarrier; and/or wherein the monitor subcarrier has a bit allocation value equal to zero.

\* \* \* \* \*